June 5, 1923.
C. H. REDDIG ET AL
PORTABLE OVEN
Filed April 15, 1921
1,458,002
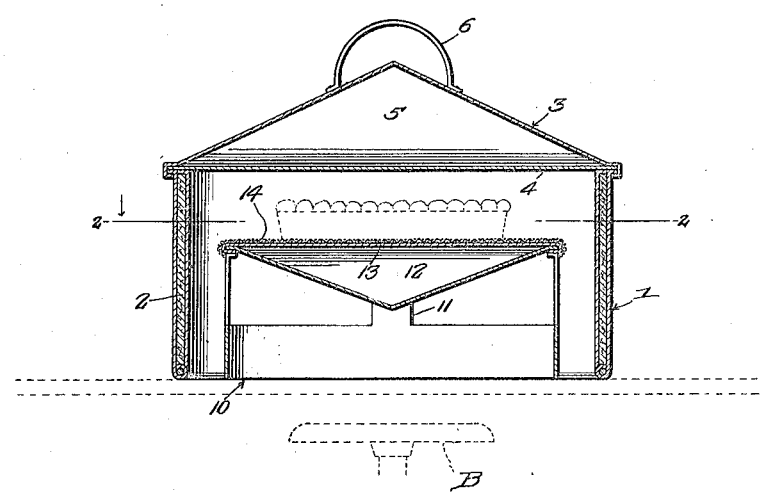
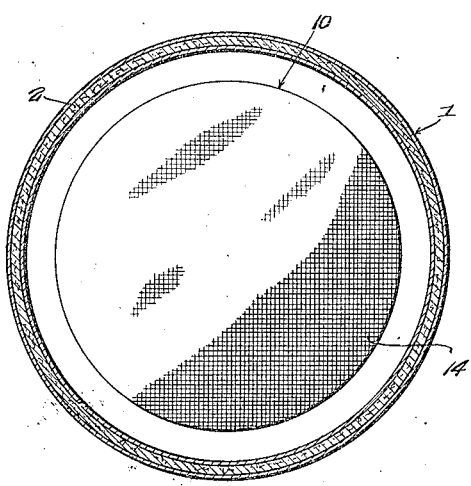
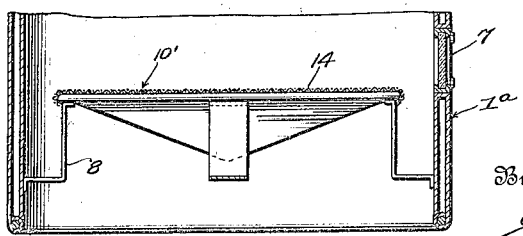
Inventor
C.H.Reddig.
H.A.Barrett,
By
Geo. F. Kimmel, Attorney Patented June 5, 1923.

1,458,002

UNITED STATES PATENT OFFICE.

CLYDE H. REDDIG AND HARRY A. BARRETT, OF LINCOLN, NEBRASKA.

PORTABLE OVEN.

Application filed April 15, 1921. Serial No. 461,708.

*To all whom it may concern:*

Be it known that we, CLYDE H. REDDIG and HARRY A. BARRETT, citizens of the United States, residing at Lincoln, in the county of Lancaster and State of Nebraska, have invented certain new and useful Improvements in a Portable Oven, of which the following is a specification.

This invention relates to ovens of the portable type and more particularly to those designed for use with gas or vapor stoves.

The object of the invention is to so construct such an oven that the food may be quickly and uniformly cooked with a minimum consumption of fuel.

Another object is to provide an oven of this character equipped with combined heat distributing and insulating means whereby all the heat produced by the burner is conserved for use in the oven and evenly distributed throughout said oven.

With these and other objects in view the invention consists of such novel features of construction as hereinafter shown and described and then specifically pointed out in the claims, and in the drawings illustrative of the preferred embodiment of the invention.

In the accompanying drawings:—

Figure 1 represents a central vertical section of an oven constructed in accordance with this invention;

Fig. 2 is a horizontal section taken on the line 2—2 of Fig. 1; and

Fig. 3 is a detail vertical section showing a slightly different form of the invention.

In the embodiment illustrated in Figs. 1 and 2 the oven constituting this invention comprises a body member or hood 1 and an inner or rack member 10. The hood 1 is closed throughout except at the bottom thereof and is in the form of a double walled structure having an insulating lining in its side walls composed of asbestos or similar material while the top 3 thereof is made in the form of a hollow cone having a closure 4 at its bottom to form a vacuum chamber 5 which not only conserves the heat within the hood but evenly distributes it throughout the oven to insure uniform baking of the food placed on the rack member 10. The hood 1 is preferably provided with a handle 6 mounted at the apex of the top thereof to facilitate the handling and transportation thereof.

The inner or rack member 10 is shown in the form of a skeleton base 11 having mounted thereon a heat distributing air or vacuum chamber 12 preferably made in the form of an inverted cone which operates as a flame deflector to throw the heat to the outside of the oven hood. The heat distributing or vacuum chamber 12 has a flat top 13 which forms the support for the food to be cooked and is preferably covered with a suitable spacing and air circulating member as shown at 14 in the form of wire cloth which operates as a spacer between the top 13 of the rack and the bottom of the pan containing the food, thereby creating an air space between the food container and the rack top or oven floor. From the above description it will be obvious that this oven will conserve all the heat developed from the burner shown at B in dotted lines and will evenly distribute it throughout the oven thereby insuring quick and uniform cooking of the food.

This oven may be constructed of any heat resisting material and it may be of any desired cross sectional contour either circular as here shown for use in connection with a single burner of a gas or kerosene stove or it may be elongated to cover two or more burners.

In the form shown in Fig. 3 the double walled structure 1ª which constitutes the side walls of the hood provides an insulating and heat conserving air space which may be used instead of the asbestos lining shown at 2 in the other figures. This oven or hood 1ª is also provided with an observation door 7 and when such a door is provided the container supporting rack may be mounted permanently to the side walls of the hood being here shown mounted on brackets L-shaped in form and connected at their respective ends to the side walls of the hood and to the top of the rack so that the rack may be supported within the hood at a suitable distance from the burner and spaced from the side walls of the hood to permit circulation of heat therearound.

The construction of this oven with its asbestos lining or air spaces in the side walls thereof and with the vacuum chamber at the top of the hood operates to retain the heat within the hood free from any internal radiation, thereby rendering it effective at a very low degree of heat from the burner, thus materially reducing the amount and expense of fuel used. Excessive unnecessary heat in warm weather is also very materially reduced thereby as is obvious.

The preferred embodiment of the invention is disclosed in the drawings and set forth in the specifications, but it will be understood that any modifications within the scope of the claims may be made in the construction without departing from the principle of the invention or sacrificing any of its advantages.

What we claim is:—

1. An oven of the class described comprising a hood with top and side walls equipped with heat insulators, and an inverted cone-shaped hollow vacuum chamber forming the food supporting member.

2. An oven of the class described, comprising a hood with top and side walls equipped with heat insulators, and an inverted cone-shaped hollow vacuum chamber having a flat top rack member constituting a food support and shaped to distribute the cooking heat toward the sides of the oven and provided with a covering constituting a spacing and air circulating means.

In testimony whereof, we affix our signatures hereto.

CLYDE H. REDDIG.
HARRY A. BARRETT.